United States Patent
Yoo et al.

(10) Patent No.: US 10,860,708 B2
(45) Date of Patent: Dec. 8, 2020

(54) APPARATUS AND METHOD FOR MEASURING SECURITY STRENGTH OF LOCK PATTERN APPLIED TO MULTI-CORE BASED TERMINAL DEVICE

(71) Applicant: KOREA UNIVERSITY RESEARCH AND BUSINESS FOUNDATION, Seoul (KR)

(72) Inventors: Chuck Yoo, Seoul (KR); Young Pil Kim, Siheung-si (KR); See Hwan Yoo, Yongin-si (KR); Kyoung Woon Lee, Seoul (KR)

(73) Assignee: KOREA UNIVERSITY RESEARCH AND BUSINESS FOUNDATION, Seoul (KR)

( * ) Notice: Subject to any disclaimer, the term of this patent is extended or adjusted under 35 U.S.C. 154(b) by 119 days.

(21) Appl. No.: 16/190,928

(22) Filed: Nov. 14, 2018

(65) Prior Publication Data

US 2020/0034525 A1 Jan. 30, 2020

(30) Foreign Application Priority Data

Jul. 26, 2018 (KR) .......... 10-2018-0087371

(51) Int. Cl.
*G06F 21/00* (2013.01)
*G06F 21/46* (2013.01)
*G06F 3/0488* (2013.01)
*G06F 21/36* (2013.01)

(52) U.S. Cl.
CPC .......... *G06F 21/46* (2013.01); *G06F 3/04883* (2013.01); *G06F 21/36* (2013.01); *G06F 2221/2149* (2013.01)

(58) Field of Classification Search
CPC .......... G06F 21/31; G06F 21/36; G06F 21/44; G06F 21/46; G06F 3/04883; G06F 2221/2149
See application file for complete search history.

(56) References Cited

U.S. PATENT DOCUMENTS

| | | | |
|---|---|---|---|
| 8,800,026 B2 * | 8/2014 | Tamaki | G06F 3/04883 345/156 |
| 9,111,076 B2 * | 8/2015 | Park | G06F 3/0412 |
| 9,230,079 B2 * | 1/2016 | Yun | G06F 21/45 |
| 9,350,852 B1 * | 5/2016 | Gudivada | H04M 1/72563 |
| 9,582,181 B2 * | 2/2017 | Yoon | G06F 3/0481 |
| 10,296,756 B2 * | 5/2019 | Oh | G06F 3/04883 |
| 2008/0115042 A1 * | 5/2008 | Akkary | G06F 9/3834 714/806 |

* cited by examiner

*Primary Examiner* — Hosuk Song
(74) *Attorney, Agent, or Firm* — Hauptman Ham, LLP (57) ABSTRACT

An apparatus and a method for measuring the security strength of a lock pattern applied to a terminal device are disclosed. The disclosed apparatus may include: a CCI monitoring part configured to read cache coherence information associated with a touch made over a multiple number of points implementing a lock pattern inputted by a user from a CCI (cache coherence interconnect); a computation part configured to compute a multiple number of similar lock pattern candidates by using the read cache coherence information; and a measurement part configured to measure the security strength of the inputted lock pattern by using the multiple number of similar lock pattern candidates.

6 Claims, 5 Drawing Sheets

| Pattern | # G | Pattern length | #UPL | Intersections | Overlaps | Pattern strength Score | Pattern complexity | Pattern strength meter (Its score) |
|---|---|---|---|---|---|---|---|---|
|  462350817 | 8 | 9 | 17.78 | 6 | 1 | 41.68 | Complex | Strong (0.83) |
|  426780 | 8 | 6 | 9.07 | 1 | 1 | 20.81 | Medium | Medium (0.47) |
|  24678 | 8 | 5 | 4.83 | 0 | 0 | 11.36 | Simple | Weak (0.36) |

FIG. 5

APPARATUS AND METHOD FOR MEASURING SECURITY STRENGTH OF LOCK PATTERN APPLIED TO MULTI-CORE BASED TERMINAL DEVICE

CROSS-REFERENCE TO RELATED APPLICATIONS

This application claims the benefit of Korean Patent Application No. 10-2018-0087371, filed with the Korean Intellectual Property Office on Jul. 26, 2018, the disclosure of which is incorporated herein by reference in its entirety.

BACKGROUND

1. Technical Field

Embodiments of the present invention relate to an apparatus and a method for measuring the security strength of a lock pattern applied to a terminal device, more particularly to an apparatus and a method for measuring the security strength of a lock pattern applied to a multi-core based terminal device using information obtainable from the CCI (cache coherent interconnect).

2. Description of the Related Art

Current terminal devices such as smart phones, etc., provide not just a single CPU but a multiple CPU environment to allow multiprocessing as well as higher performance and lower power consumption. In particular, a multi-core environment is supported for efficient transfer of information between CPU's through a shared cache memory. In a platform where terminal devices of a multi-core environment are packaged, an internal bus may be established for efficient communication between the CPU and memory, and a high-performance cache memory capable of quick access may be present in the separated cores. A multi-core environment may require a cache coherency technique, for maintaining the cache memory in a coherent state, and a CCI (cache coherence interconnect), which is a device supporting such technique. The CCI can track the cache state and provide an interface through which to obtain relevant statistics data, and system software such as an operating system can utilize information read from the CCI for administrative purposes.

The lock pattern or PSL (pattern screen lock) is a technique for preventing access to a terminal device such as an Android or iOS device. The lock pattern, also known as a graphical password, may involve making a pattern through a finger gesture and authenticating a user by way of such pattern. In the case of an Android based terminal device, a lock pattern may basically be configured with nine points in a 3×3 grid. Particularly in a mobile device, where usability is of greater importance, the lock pattern is widely being used, as it is more convenient and easier to use compared to a PIN (personal information number) or a regular password.

However, the lock pattern is vulnerable to shoulder surfing, camera attacks, and smudge attacks, and as such, the measuring of the security strengths of lock patterns is gaining attention as an important current issue.

SUMMARY OF THE INVENTION

To resolve the problems in the related art described above, an aspect of the invention proposes an apparatus and a method for measuring the security strength of a lock pattern based on information that can be obtained from the CCI equipped in a multi-core based terminal device.

Other objectives of the invention can be derived by the skilled person from the embodiments set forth below.

To achieve the objectives above, a preferred embodiment of the invention provides an apparatus for measuring a security strength of a lock pattern applied to a multi-core based terminal device, where the apparatus includes: a CCI monitoring part configured to read cache coherence information associated with a touch made over a multiple number of points implementing a lock pattern inputted by a user from a CCI (cache coherence interconnect); a computation part configured to compute a multiple number of similar lock pattern candidates by using the read cache coherence information; and a measurement part configured to measure the security strength of the inputted lock pattern by using the multiple number of similar lock pattern candidates.

The computation part can compute the multiple number of similar lock pattern candidates by using pre-stored advance information and the read cache coherence information, where the advance information can include the number of bends for each of a multiple number of lock input patterns inputted beforehand and the overall lock pattern length of each of the multiple number of lock input patterns.

The numbers of bends and the overall pattern lengths can be stored in groups, where at least one lock pattern shapes having the same number of bends can be grouped into one group, for groups based on the numbers of bends, and one or more lock pattern shapes having the same overall pattern length can be grouped into one group, for groups based on the overall pattern lengths.

The computation part can compute the number of bends in the inputted lock pattern and the overall pattern length of the inputted lock pattern by using the read cache coherence information, select a group from among the groups based on the numbers of bends by using the number of bends of the inputted lock pattern, and select a group from among the groups based on the overall pattern lengths by using the overall pattern length of the inputted lock pattern, where at least some of the lock pattern shapes included in an intersection set of the at least one lock pattern shapes in the selected group for the number of bends and the one or more lock pattern shapes in the selected group for the overall pattern length can be computed as the multiple number of similar lock pattern candidates.

The measurement part can measure whether the security strength of the inputted lock pattern is strong or weak, with the security strength of the inputted lock pattern measured as being weak if the inputted lock pattern is identical to any one of the similar lock pattern candidates, and the security strength of the inputted lock pattern measured as being strong if the inputted lock pattern is not identical to any of the similar lock pattern candidates.

Another embodiment of the invention provides a method for measuring the security strength of a lock pattern applied to a multi-core based terminal device, where the method includes: reading cache coherence information associated with a touch made over a multiple number of points implementing a lock pattern inputted by a user from a CCI (cache coherence interconnect); computing a multiple number of similar lock pattern candidates by using the read cache coherence information; and measuring the security strength of the inputted lock pattern by using the multiple number of similar lock pattern candidates.

An embodiment of the invention provides the advantage of enabling an accurate measurement of the security strength of a lock pattern.

The advantageous effects of the invention are not limited to the above effect but rather encompass all effects that are disclosed in or can be inferred from the detailed description of the invention and the scope of claims set forth below.

DETAILED DESCRIPTION OF THE INVENTION

In the present specification, an expression used in the singular encompasses the expression of the plural, unless it has a clearly different meaning in the context. In the present specification, it is to be understood that terms such as "being composed" or "including", etc., are not to be interpreted as meaning that the various components or the various steps disclosed in the specification must all necessarily be included, but rather should be interpreted as meaning that some of the components or some of the steps may not be included or additional components or steps may further be included. A term such as "part", "module", etc., in the specification refers to a unit component by which at least one function or action is processed, where such unit component can be implemented as hardware or software or as a combination of hardware and software.

Various embodiments of the invention are described below in further detail, with reference to the accompanying drawings.

Figure 1:
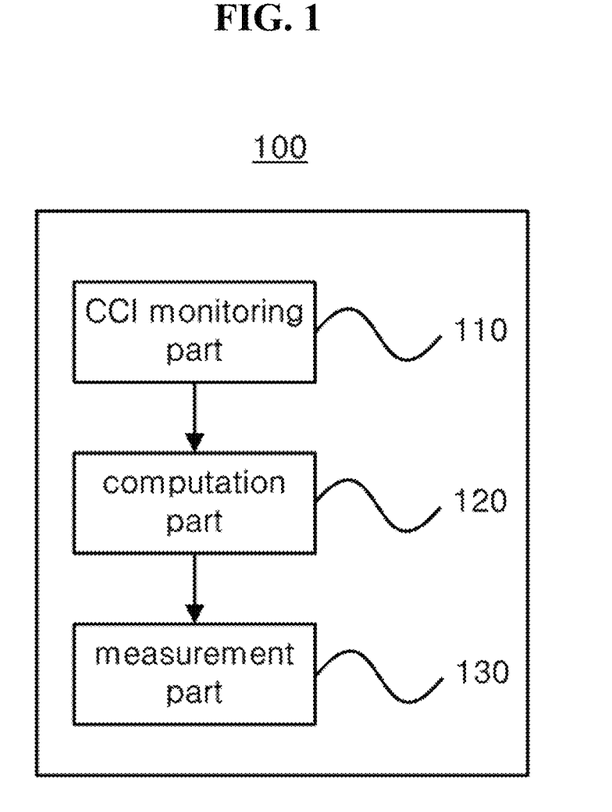
FIG. 1 schematically illustrates the composition of an apparatus for measuring the security strength of lock patterns according to an embodiment of the invention.

FIG. 1 schematically illustrates the composition of an apparatus for measuring the security strength of lock patterns according to an embodiment of the invention.

Referring to FIG. 1, an apparatus 100 for measuring security strength according to an embodiment of the invention can be a module representing a functional and structure combination of hardware for executing the technical spirit and software for operating the hardware and can be an apparatus for measuring the security strength of a lock pattern applied to a multi-core based terminal device, where the apparatus may include a CCI monitoring part 110, a computation part 120, and a measurement part 130. A more detailed description of the functions of each component is provided below.

First, the CCI monitoring part 110 may read cache coherence information, which may be information associated with a touch made over a multiple number of points inputted by the user to implement a lock pattern, from a CCI (cache coherence interconnect). Here, the CCI may store the cache coherence information in each of the multiple cores as a CCI event. That is, a CCI event may be an event that occurs for maintaining cache coherence in a heterogeneous multi-core environment.

Figure 2:
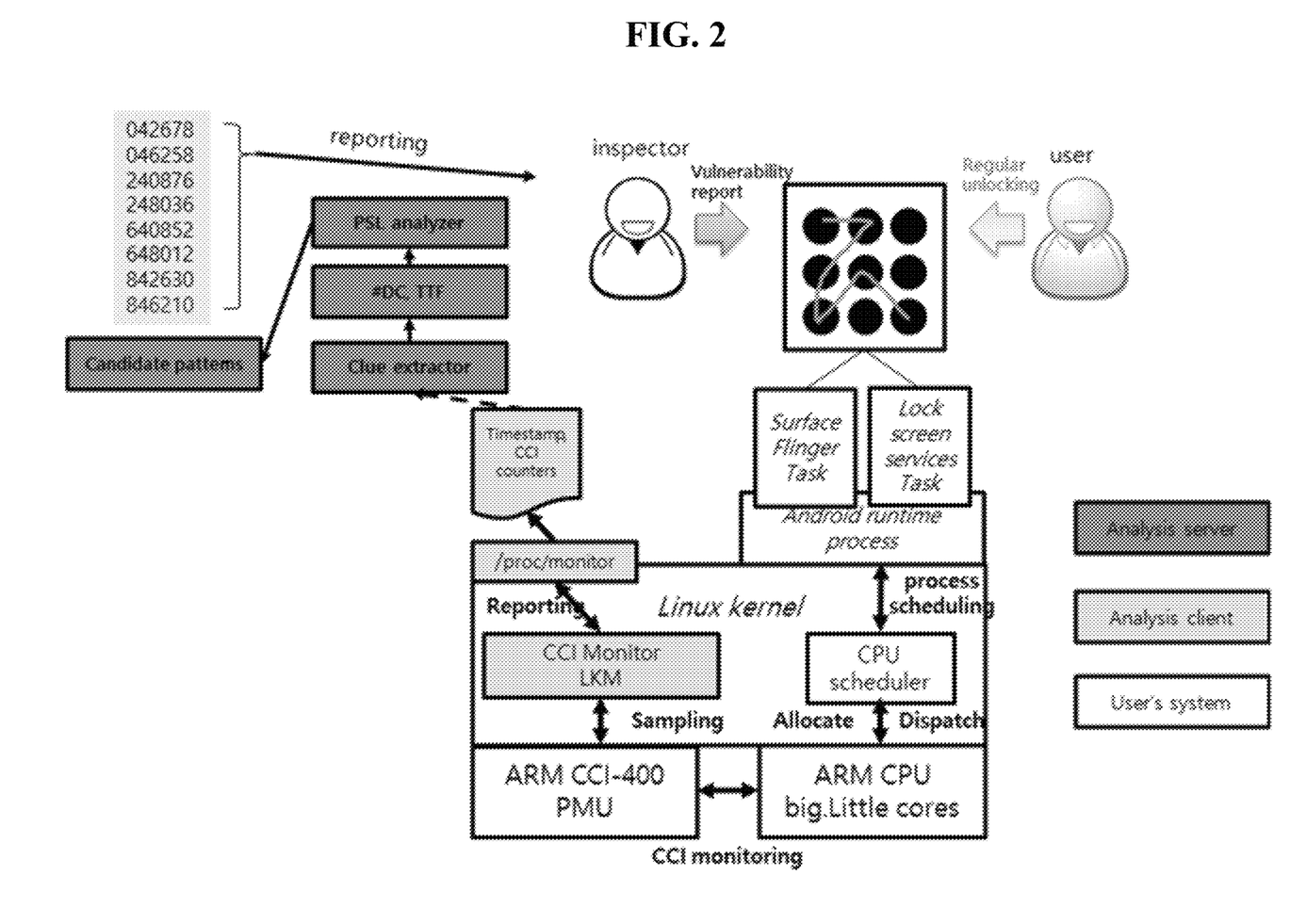
FIG. 2 illustrates the concept of a CCI monitoring part according to an embodiment of the invention.

More specifically, the CCI monitoring part 110 can be a Linux kernel model and may load CCI events to generate an analyzable log. FIG. 2 illustrates the concept of the CCI monitoring part 110. The operation of the CCI monitoring part 110 may be activated when the user inputs a lock pattern and may entail loading cache coherence information, which may be generated when Linux processes running in an operating system (e.g. Android OS) are operated in heterogeneous multiple cores, from the device register of the CCI and recording it in a special file named "/proc/monitor". The counter value of the CCI can be recorded, together with a time stamp, in this file for a period of time, where the recording cycle can be adjusted according to a setting.

Next, the computation part 120 may compute a multiple number of similar lock pattern candidates by using the read cache coherence information.

Here, the similar lock pattern candidates may be a multiple number of lock patterns, for example twenty lock patterns, that are similar to the lock pattern inputted by the user and may be used to measure the security strength of the lock pattern inputted by the user as described below.

According to an embodiment of the invention, the computation part 120 can compute the multiple number of similar lock pattern candidates by using pre-stored advance information and the read cache coherence information noted above. A more detailed description is provided as follows.

Using the read cache coherence information mentioned above, the computation part 120 may compute the number of bends in the lock pattern inputted by the user and the overall pattern length of the lock pattern inputted by the user.

Here, the number of bends in a lock pattern refers to the number of bends resulting from a change in direction in the lock pattern. For example, if a lock pattern is shaped as '¬' or ']', the number of bends is one, if a lock pattern is shaped as '⊏', the number of bends is two, and if a lock pattern is shaped as '⌊', the number of bends is four.

To compute the number of bends, the computation part 120 may map the 3×3 grid of nine points for drawing lock patterns as a 2-dimensional Euclidean coordinate system and may express the inputted lock pattern as a multiple number of unit vectors. The multiple unit vectors may be read sequentially to attempt a vector sum, and a determining equation f for determining same and different directions may be applied to the result. Here, a determining equation f such as that shown in Equation 1 may be used, which utilizes the three points, $(x_i, y_i)$, $(x_{i+1}, y_{i+1})$, and $(x_{i+2}, y_{i+2})$.

$$f = \sqrt{(x_{i+1}-x_i)^2+(y_{i+1}-y_i)^2} + \sqrt{(x_{i+2}-x_{i+1})^2+(y_{i+2}-y_{i+1})^2} - \sqrt{(x_{i+2}-x_i)^2+(y_{i+2}-y_i)^2} \quad \text{[Equation 1]}$$

For the determining, the counter c may be maintained, and if f>0, the counter c may be increased. After going through all of the vectors of the lock pattern, the counter value c may be computed as a number within a range of minimum 1 and maximum 7, and this number would be the number of bends.

Figure 3:
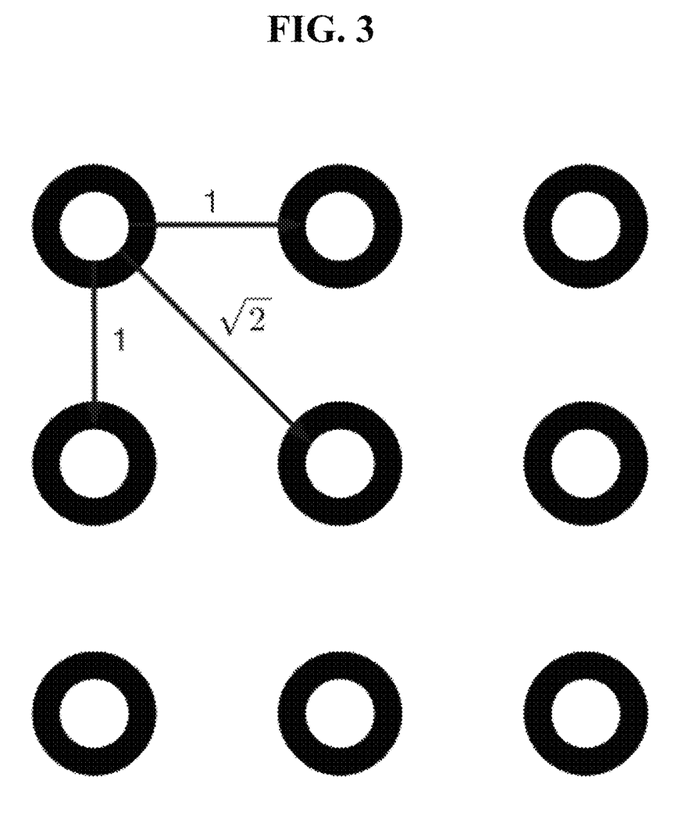
FIG. 3 illustrates the concept of overall lock pattern length according to an embodiment of the invention.

The overall length of a lock pattern may refer to the overall length when the lock pattern passes through the points precisely (ideally). For example, the length between two points that are adjacent laterally or adjacent longitudinally may be defined as '1', the length between two points that are adjacent diagonally may be defined as $\sqrt{2}$, and the overall length of the lock pattern may be defined as the total sum length of the lock pattern passing through the points. This is as illustrated in FIG. 3.

In order to compute this overall length of the lock pattern, the computation part 120 may map the 3×3 grid of nine points for drawing lock patterns as a 2-dimensional Euclidean coordinate system and may obtain the length of the path passing through the points included in the lock pattern. The total length of the lock pattern may be obtained by reading the points included in the lock pattern sequentially two at a time and using a Euclidean distance equation for obtaining the length between two points. For this, the gap between each grid point may be set to a unit value of 1, and calculating for the 389,112 possible combinations of lock patterns, the overall lock pattern length lies within a range of '3' to '17.78'.

Then, the computation part 120 may compare the pre-stored advance information with the read cache coherence information to compute a multiple number of similar lock pattern candidates.

Here, the advance information can include the number of bends in each of a multiple number of lock input patterns inputted beforehand and the overall pattern length of each of the multiple number of lock input patterns, where the multiple number of lock input patterns can be all possible combinations of lock patterns. That is, the advance information can include the numbers of bends for all lock patterns and the overall lock pattern length of every lock pattern. Here, the numbers of bends and the overall lock pattern lengths included as the advance information can be stored after computations based on a mapping of a 2-dimensional Euclidean coordinate system as described above.

Also, the numbers of bends and the overall lock pattern lengths included as the advance information can be stored in groups. Here, in the case of groups based on the numbers of bends, at least one lock pattern shapes having the same number of bends may be grouped into one group. Also, in the case of groups based on the overall pattern lengths, one or more lock pattern shapes having the same overall pattern length can be grouped into one group.

For example, for lock patterns shaped as '¬' or '⌐', the number of bends is one, and as such these can be grouped into a first group, whereas for lock patterns shaped as '⊏' or 'Π', the number of bends is two, and as such these can be grouped into a second group. Therefore, a total of seven groups can be created. Also, since the overall lock pattern lengths range from a minimum of '3' to a maximum of '17.78', the total number of groups based on the overall lock pattern length can be 273, with the number of lock patterns included in the groups ranging from 8 to 12248.

According to an embodiment of the invention, the computation part 120 may use the number of bends in the lock pattern inputted from the user to select one of the groups of bend numbers and may use the overall pattern length of the lock pattern inputted from the user to select one of the groups of overall pattern lengths. Afterwards, the computation part 120 can compute a multiple number of similar lock pattern candidates as at least some of the lock pattern shapes included in the intersection set of at least one lock pattern shapes included in the selected group for the number of bends and one or more lock pattern shapes included in the selected group for the overall pattern length.

For example, if the number of bends in the inputted lock pattern as computed by way of a CCI event is 2, then the computation part 120 may select a group (hereinafter referred to as group A) having 2 as the number of bends from among the groups for the numbers of bends, and if the overall pattern length of the inputted lock pattern as computed by way of a CCI event is 6, then the computation part 120 may select a group (hereinafter referred to as group B) having 6 as the overall pattern length from among the groups for the overall pattern lengths. Also, the computation part 120 may consider combinations for at least one lock pattern shapes belonging to group A and one or more lock pattern shapes belonging to group B to compute multiple lock pattern shapes of which the number of bends is 2 and the overall lock pattern length is 6. Afterwards, the computation part 120 may compute at least some of the multiple lock pattern shapes as the multiple number of similar lock pattern candidates.

In this case, the computation part 120 can select at least some of the multiple lock patterns by using entropy.

To be more specific, entropy used in an embodiment of the invention may be a metric for measuring the average or expected number of guesses, where a greater number of guesses results in lower entropy, and since this means that inference becomes more difficult, entropy can be used to qualitatively ascertain that a lock pattern is not vulnerable.

Here, measurement by entropy may correspond to the average number of guessing operations needed by an attack optimized for finding a lock pattern, and this can be expressed as Equation 2 below.

$$Entropy_{(X)} = E\left[\#G\left(X \xrightarrow{R} \chi\right)\right] = \sum_{i=1}^{N} p_i i \quad \text{[Equation 2]}$$

Here, X is a random variable representing a target lock pattern that is the object of guessing, and i is an index of a lock pattern selected by guessing and is incremented each time an arbitrary extraction is attempted. Also, χ has a distribution of all lock patterns that are objects of the guessing. In other words, $X \xrightarrow{R} \chi$ represents randomly extracting from a distribution of all lock patterns. Also, #G is the total number of calculations needed for the random guessing, and in an embodiment of the invention, #G can be used for the number of bends and the overall lock pattern length.

Lastly, the measurement part 130 may measure the security strength of the lock pattern inputted from the user by using the multiple number of similar lock pattern candidates. That is, the measurement part 130 may measure whether the security strength of the lock pattern inputted from the user is strong or weak.

According to an embodiment of the invention, if the inputted lock pattern is the same as any one of the multiple number of similar lock pattern candidates, the measurement part 130 may measure the security strength of the inputted lock pattern as being weak. Conversely, if the inputted lock pattern is not the same as any of the multiple number of similar lock pattern candidates, the measurement part 130 may measure the security strength of the inputted lock pattern as being strong.

In summary, an embodiment of the invention provides the advantage of enabling an accurate measurement for the security strength of lock patterns based on information that can be obtained from a CCI provided in a multi-core based terminal device.

The advantageous effects provided by an embodiment of the invention are described below in further detail with reference to FIG. 4.

Figure 4:
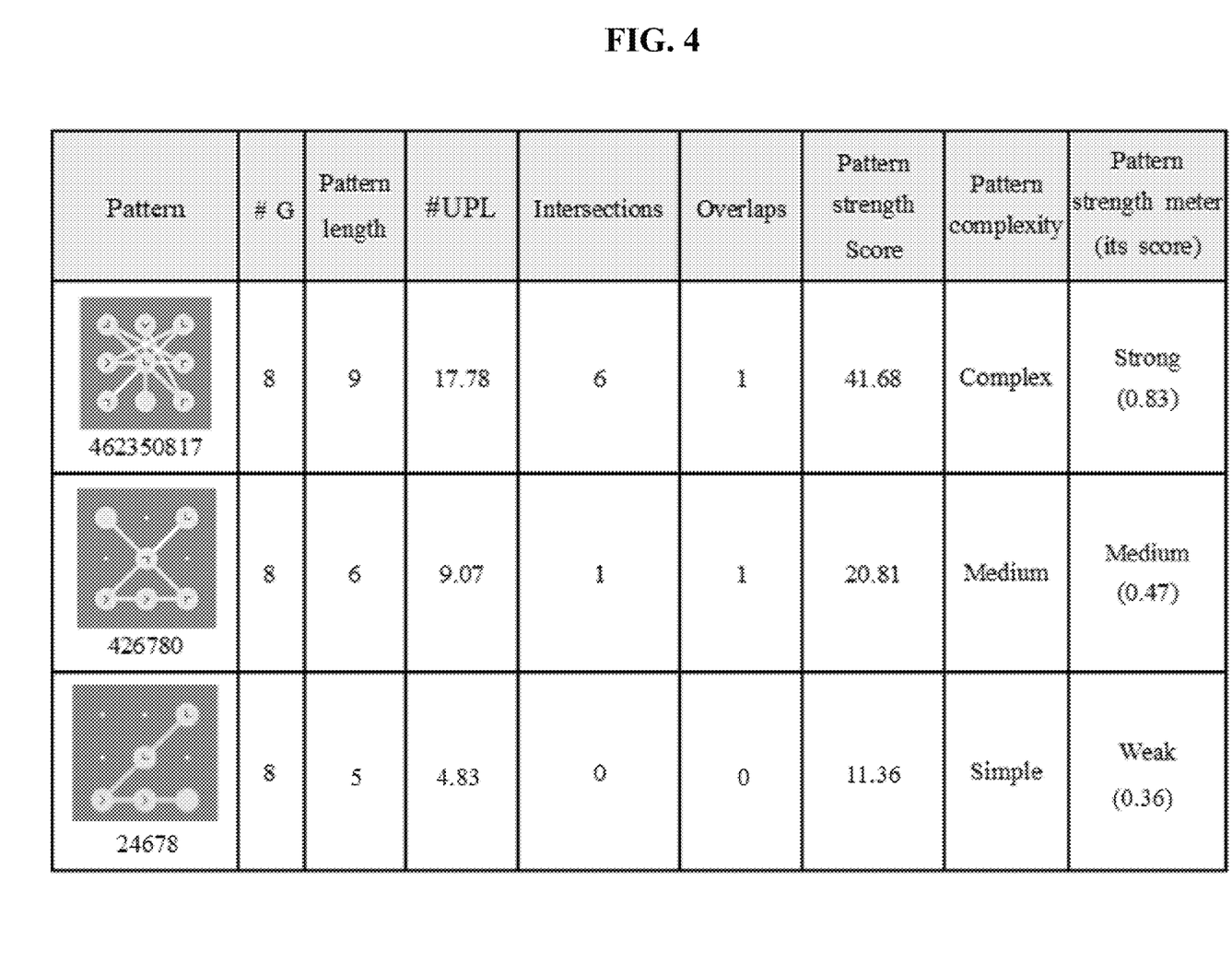
FIG. 4 illustrates an effect obtained by an embodiment of the invention.

FIG. 4 illustrates a table that lists the security strength values for specific lock patterns.

Here, the number shown in the 'Pattern' column is an expression of the corresponding lock pattern if the points of the 3×3 grid for entering lock patterns are numbered from 0 to 8. Also, '#G' represents the number of lock pattern estimations, used for evaluating entropy, 'Pattern length' represents the number of points used in the lock pattern, '#UPL' represents the overall length of the lock pattern, 'Intersections' represents the number of intersecting points in the lock pattern, and 'Overlaps' represents the number of times lines overlap within the lock pattern.

The elements above were extracted after evaluations where three representative methods according to the related art that study parameters expressing the security strengths of patterns were applied. The methods for evaluating the security strength of lock patterns according to the related art include methods associated with the pattern strength score, pattern complexity, and pattern strength meter. In the case of the pattern strength score, a score is obtained, where a score of 40 points or higher evaluated as being the strongest, a score of 10 points or lower evaluated as being weak, and a score in-between evaluated as being medium. With pattern complexity, the total range of the pattern strength score is divided into three sections of equal size: simple, medium, and complex. Also, with the pattern strength meter, the existing pattern strength score is modified such that a proportion of overlapping sections in the pattern is applied, and similarly, an evaluation of weak, medium, or strong may be applied.

Referring to FIG. 4, the pattern evaluated as being strong according to existing methods as well as those patterns that are not evaluated as being strong according to existing methods are all considered to have low security strength according to an embodiment of the invention. That is, it can be seen that even for the pattern having the highest security strength, i.e. the pattern evaluated with "40 points or higher", "Complex", and "Strong", a similar pattern can be found with a maximum of 8 attempts. Thus, it can be said that the method for measuring the security strength according to an embodiment of the invention is superior.

Figure 5:
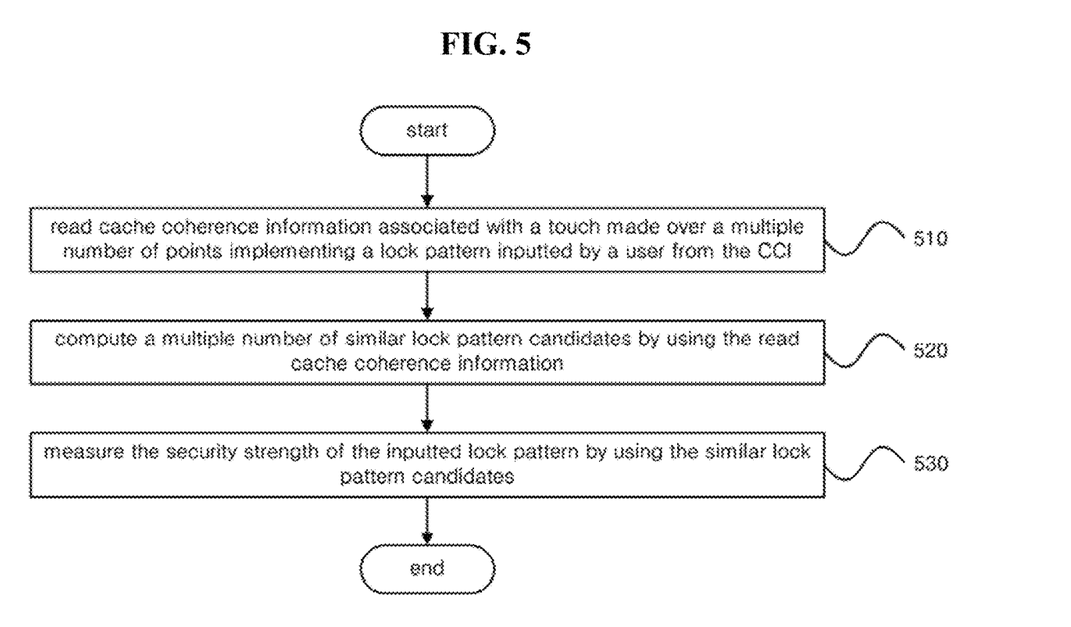
FIG. 5 is a flow diagram of a method for measuring the security strength of a lock pattern applied to a multi-core based terminal device according to an embodiment of the invention.

FIG. 5 is a flow diagram of a method for measuring the security strength of a lock pattern applied to a multi-core based terminal device according to an embodiment of the invention. Here, the method above can be executed by a processor. The procedures involved in each operation are described below in more detail.

Firstly, in operation 510, cache coherence information associated with a touch made over a multiple number of points that implement a lock pattern inputted by a user may be read from the CCI.

Next, in operation 520, a multiple number of similar lock pattern candidates may be computed by using the read cache coherence information.

According to an embodiment of the invention, the operation 520 may entail computing the multiple number of similar lock pattern candidates using pre-stored advance information and the read cache coherence information, where the advance information can include the number of bends for each of a multiple number of lock input patterns inputted beforehand and the overall lock pattern length of each of the multiple number of lock input patterns.

In this case, the numbers of bends and overall pattern lengths forming the advance information can be stored in groups, and for the groups based on the number of bends, at least one lock pattern shapes that include the same number of bends can be grouped into one group, and one or more lock pattern shapes having the same overall pattern length can be grouped into one group.

Also, according to an embodiment of the invention, operation 520 can include computing the number of bends in the inputted lock pattern and the overall pattern length of the inputted lock pattern by using the read cache coherence information, selecting one of the groups for the number of bends by using the number of bends in the inputted lock pattern, selecting one of the groups for the overall pattern length by using the overall pattern length of the inputted lock pattern, and computing a multiple number of similar lock pattern candidates as at least some of the lock pattern shapes in an intersection set between the at least one lock pattern shapes included in the selected group for the number of bends and the one or more lock pattern shapes included in the selected group for the overall pattern length.

Lastly, in operation 530, the security strength of the inputted lock pattern may be measured using the multiple number of similar lock pattern candidates.

A method for measuring the security strength of lock patterns according to certain embodiments of the invention has been described above, and the composition of the apparatus 100 for measuring the security strength of a lock pattern described above with reference to FIG. 1 to FIG. 4 can be applied as is to the present embodiment. As such, redundant descriptions of certain details are omitted.

Certain embodiments of the present invention can be implemented in the form of program instructions that may be performed using various computer means and can be recorded in a computer-readable medium. Such a computer-readable medium can include program instructions, data files, data structures, etc., alone or in combination.

The program instructions recorded on the medium can be designed and configured specifically for the present invention or can be a type of medium known to and used by the skilled person in the field of computer software. Examples of a computer-readable medium may include magnetic media such as hard disks, floppy disks, magnetic tapes, etc., optical media such as CD-ROM's, DVD's, etc., magneto-optical media such as floptical disks, etc., and hardware devices such as ROM, RAM, flash memory, etc. Examples of the program of instructions may include not only machine language codes produced by a compiler but also high-level language codes that can be executed by a computer through the use of an interpreter, etc. The hardware mentioned above can be made to operate as one or more software modules that perform the actions of the embodiments of the invention, and vice versa.

While the present invention has been described above using particular examples, including specific elements, by way of limited embodiments and drawings, it is to be appreciated that these are provided merely to aid the overall understanding of the present invention, the present invention is not to be limited to the embodiments above, and various modifications and alterations can be made from the disclosures above by a person having ordinary skill in the technical field to which the present invention pertains. Therefore, the spirit of the present invention must not be limited to the embodiments described herein, and the scope of the present invention must be regarded as encompassing not only the claims set forth below, but also their equivalents and variations.

What is claimed is:

1. An apparatus for measuring a security strength of a lock pattern applied to a multi-core based terminal device, the apparatus comprising:
    a CCI monitoring part configured to read cache coherence information from a CCI (cache coherence interconnect), the cache coherence information associated with a touch made over a plurality of points implementing a lock pattern inputted by a user;
    a computation part configured to compute a plurality of similar lock pattern candidates by using the read cache coherence information; and
    a measurement part configured to measure a security strength of the inputted lock pattern by using the plurality of similar lock pattern candidates, wherein the computation part computes the plurality of similar lock pattern candidates by using pre-stored advance information and the read cache coherence information, and wherein the pre-stored advance information includes a number of bends for each of a plurality of lock input patterns inputted beforehand and an overall lock pattern length of each of the plurality of lock input patterns.

2. The apparatus for measuring a security strength of a lock pattern according to claim 1, wherein the numbers of bends and the overall pattern lengths are stored in groups, and wherein one or more lock pattern shapes having a same number of bends are grouped into one group, for groups based on the numbers of bends, and one or more lock pattern shapes having a same overall pattern length are grouped into one group, for groups based on the overall pattern lengths.

3. The apparatus for measuring a security strength of a lock pattern according to claim 2, wherein the computation part:

computes a number of bends in the inputted lock pattern and an overall pattern length of the inputted lock pattern by using the read cache coherence information, selects a group from among the groups based on the numbers of bends by using the number of bends of the inputted lock pattern, and selects a group from among the groups based on the overall pattern lengths by using the overall pattern length of the inputted lock pattern, and wherein at least some of lock pattern shapes included in an intersection set of the one or more lock pattern shapes in the selected group for the number of bends and the one or more lock pattern shapes in the selected group for the overall pattern length are computed as the plurality of similar lock pattern candidates.

4. The apparatus for measuring a security strength of a lock pattern according to claim 1, wherein the measurement part measures whether the security strength of the inputted lock pattern is strong or weak, and wherein the measurement part measures the security strength of the inputted lock pattern as being weak if the inputted lock pattern is identical to any one of the plurality of similar lock pattern candidates, and the measurement part measures the security strength of the inputted lock pattern as being strong if the inputted lock pattern is not identical to all of the plurality of similar lock pattern candidates.

5. A method for measuring a security strength of a lock pattern applied to a multi-core based terminal device, the method comprising:

reading cache coherence information from a CCI (cache coherence interconnect), the cache coherence information associated with a touch made over a plurality of points implementing a lock pattern inputted by a user;

computing a plurality of similar lock pattern candidates by using the read cache coherence information; and measuring a security strength of the inputted lock pattern by using the plurality of similar lock pattern candidates, wherein the computing includes computing the plurality of similar lock pattern candidates by using pre-stored advance information and the read cache coherence information, and wherein the pre-stored advance information includes a number of bends for each of a plurality of lock input patterns inputted beforehand and an overall lock pattern length of each of the plurality of lock input patterns.

6. A non-transitory recorded medium readable by a computer, the non-transitory recorded medium having recorded thereon a program of instructions for performing the method of claim 5.

* * * * *